United States Patent [19]

Dain et al.

[11] Patent Number: 4,802,064
[45] Date of Patent: Jan. 31, 1989

[54] CAPACITOR WITH MOUNTING RING

[75] Inventors: Lester C. Dain, West Jefferson, N.C.; Steven A. Rubin, Sharon, Mass.

[73] Assignees: Sprague Electric Company; Universal Products, Inc., both of North Adams, Mass.

[21] Appl. No.: 157,566

[22] Filed: Feb. 19, 1988

[51] Int. Cl.⁴ .............................................. H01G 9/00
[52] U.S. Cl. .................................................... 361/519
[58] Field of Search ................................. 361/433, 403

[56] References Cited

U.S. PATENT DOCUMENTS

| | | |
|---|---|---|
| 2,118,665 | 5/1938 | Churchill ........................ 361/433 X |
| 2,264,405 | 12/1941 | Poitras ................................. 361/433 |
| 2,881,368 | 4/1959 | Hancock ............................. 361/433 |
| 3,014,195 | 12/1961 | May et al. .......................... 339/131 |
| 3,555,370 | 1/1971 | Bowling .............................. 361/433 |
| 4,480,289 | 10/1984 | Huffman ............................ 361/403 |
| 4,538,025 | 8/1985 | Coe et al. ........................... 174/52 S |

FOREIGN PATENT DOCUMENTS 137862 7/1950 Australia ............................. 361/433

Primary Examiner—Donald A. Griffin

[57] ABSTRACT

A mounting ring is secured in the mouth end of a capacitor casing by being engaged under the rolled-over rim of the fully sealed capacitor.

6 Claims, 1 Drawing Sheet

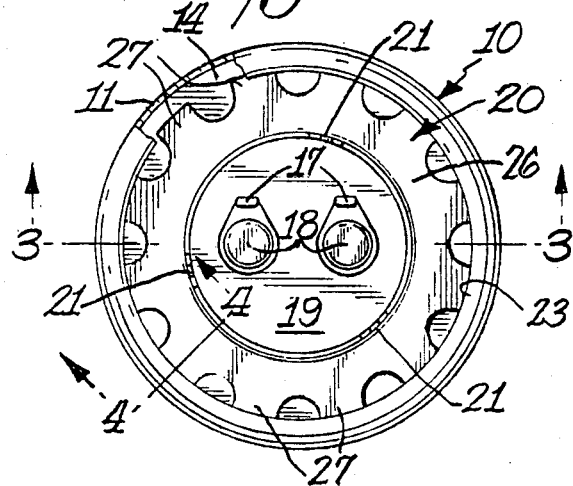
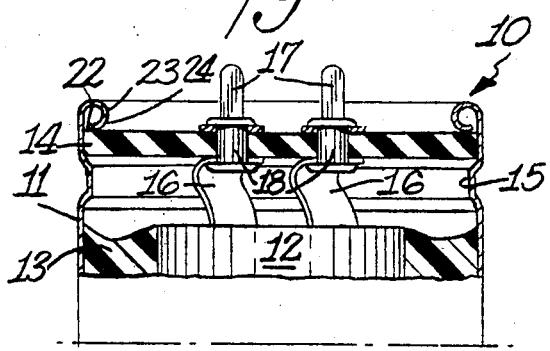
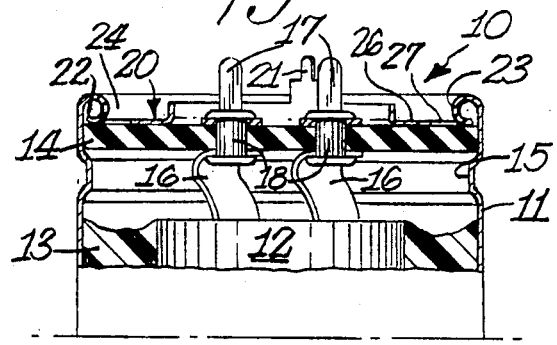
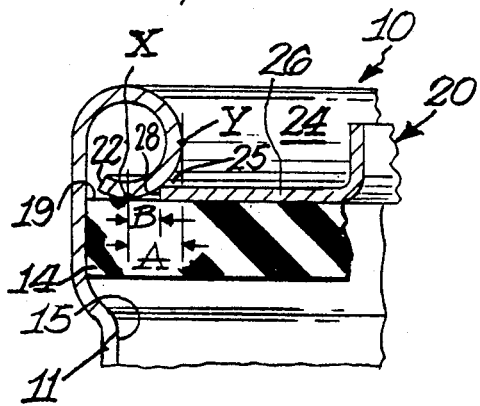

CAPACITOR WITH MOUNTING RING

BACKGROUND OF THE INVENTION

This invention relates to an arrangement for adapting sealed capacitors for mounting on suitable supports such as a chassis or a printed circuit board. More particularly, this invention relates to such a sealed capacitor which is adapted to receive and retain a mounting ring after the capacitor has been completely assembled and sealed, and is independent of the completion of the capacitor manufacture.

Components have been provided in which a mounting ring is secured in a capacitor during the sealing step in the manufacture of the capacitor; May et al show such a construction in U.S. Pat. No. 3,014,195 issued Dec. 19, 1961.

It is also known to utilize a retaining ring having teeth which lock under protrusions in a capacitor casing during the sealing of the capacitor; Coe et al show such a construction in U.S. Pat. No. 4,538,025 issued Aug. 27, 1985.

It is an object of the present invention to provide an arrangement of a sealed capacitor with terminals adaptable for use in electrical circuits and in combination with a mounting means for use on a support member, such as a printed circuit board.

It is a further object to provide a capacitor arrangement which permits the attachment to the completed capacitor of a circuit board mounting means at any time subsequent to the completion of capacitor manufacture.

SUMMARY OF THE INVENTION

The present invention is directed to the cooperative relationship between a sealed capacitor, such as for example a sealed electrolytic capacitor, and a means attachable to and retained by the capacitor at any time after the completion of its manufacture. The subsequently attachable means is provided with prongs which project axially of the capacitor and are adapted to mounting of the capacitor on a support, as for example a printed circuit board, by insertion.

To accomodate the reception and retention of the mounting means, the capacitor casing has an open end defined by a peripheral rolled-over rim. The rim is rolled over in an inward bend terminating in a curve pressed against the closure of the capacitor so as to provide pressure on the closure, as for example against a groove in the casing wall. The rolling-over action exerted on the casing rim coils the casing wall into a convolution, with the edge of the rim carried inside the convolution; the resulting curl applies the bearing pressure on the closure against the groove. The curl contacting and adjacent to the outer surface of the closure forms a recess with the closure surface on the inward side of the curl.

The closure is provided with electrical leads connected to suitable terminals for attachment of the completed capacitor in electrical circuits.

Thus, according to this invention, the arrangement is such that the completion of the combination calls for a step of assembly only subsequently to the otherwise completed and the sealed capacitor.

The mounting means is a ring-like structure encircling an open center and having outwardly extending fingers and constructed of a resilient material, such as steel. The fingers are sufficiently flexible to be insertable into the recess after the capacitor is in final form so as to be entrapped under the curl between the curl and the closure.

A feature of this invention is the provision of the capacitor having a mounting ring which provides the capacitor with the capability of keyed insertion into a printed wiring board (PWB), standoff mounting to facilitate cleaning of the PWB, and improved stability and mechanical strength in the PWB.

Another feature of this invention is the provision of an electrolytic capacitor which is fully sealed against electrolyte leakage before a mounting ring is secured to the capacitor.

The above-described and other advantages of the present invention will be apparent and understood by those skilled in the art upon consideration of the following detailed description taken together with the accompanying drawing.

BRIEF DESCRIPTION OF THE DRAWING

FIG. 1 is a longitudinal sectional view of the sealed end of an assembled capacitor without a mounting means;

FIG. 2 is a top plan view of the sealed end of an assembled capacitor with a mounting means in place;

FIG. 3 is a longitudinal sectional view taken on line 3—3 of FIG. 2 showing the sealed end of the assembled capacitor with the mounting means in place; and FIG. 4 is an enlarged longitudinal sectional view taken on line 4—4 of FIG. 2 showing a portion of the sealed end of the assembled capacitor and mounting means.

DESCRIPTION OF THE PREFERRED EMBODIMENT

FIG. 1 shows a sealed capacitor 10 having a casing 11 containing a capacitor body 12.

The capacitor body 12 is a convolutely-wound capacitor section; according to the preferred embodiment body 12 is a tab-wound aluminum electrolytic capacitor section. The casing 11 also preferably of aluminum contains a suitable electrolyte 13 of the art. A closure member 14 of compressible material is positioned adjacent the open mouth end of casing 11 and is seated on a grooved rib 15 of casing 11. A pair of electrically conductive tabs 16 connect the electrodes of the convolutely-wound body 12 to terminals 17 through rivets 18 which extend through closure member 14.

As shown in the top plan view of FIG. 2, the terminals 17 are centrally positioned in an outer surface 19 of the closure member 14 and are encircled by a mounting ring 20 which runs peripherally around the open end of the casing 11 and has a plurality of prongs 21. As shown in FIGS. 3 and 4, the ring 20 is seated on the outer surface 19 of closure member 14 and the prong 21 extends in an axial direction outward of the open end of the casing 11.

In FIG. 4 the enlarged view illustrates the relationship between the casing 11, the closure member 14, and the ring 20 at their engagement around the periphery of the open end. As previously mentioned, the closure member 14 seats on the grooved rib 15 which extends inwardly of the capacitor 10, obtained for example by working the ductile wall of casing 11. The open end of the casing 11 terminates in a rim 22 which is coiled inwardly and around by a metal working operation which coils the casing 11 convolutely upon itself to form a curl 23 at the rim 22. As seen in FIGS. 1-4, and particularly in FIG. 2, this curl 23 is the periphery of the open end of the casing 11.

In the forming of the curl 23 in the coiling operation on the rim 22, the casing 11 is so coiled that an initially outer surface 24 is worked around and into engagement with the outer surface 19 of closure member 14.

At the same time this coiling operation foreshortens the axial spacing between the rim 22 and the rib 15. These combined actions of the contact of surface 24 on outer surface 19, and the reduction of axial spacing, seals the closure member 14 between the curl 23 and the rib 15. As pointed out above, this sealing operation, which is the result of the working of the casing rim 22, is part of the assembly of the capacitor 10 independent of the mounting ring 20. As shown in FIG. 1, the rolled-over rim 22 is in place and the sealing operation of the capacitor assembly is completed. Thus the capacitor 10 as illustrated in FIG. 1 is a sealed and completed electrical component.

With further reference to FIG. 4, the radial spacing between a point of contact X of the outer surface 24 with the surface 19 and an innermost point Y of the curl 23 is illustrated by the dimension bounded by an axial line drawn to intersect at the point of contact X and an axial line drawn tangent to innermost point Y.

A recess 25 is formed by the coiling of the casing rim 22. The recess 25 is formed between the surface 19 and the curl 23 and is bounded by the portion of the surface 19 delineated by dimension A and the surface portion of curl 23 between points X and Y. It will be readily understood that this recess 25 circles around the capacitor superimposed by the curl 23 which girdles the capacitor 10.

Referring to FIG. 2, the mounting ring 20 is shown in plan view positioned in the open end of casing 11. The ring 20 is comprised of a circular band 26 defining an open center, teeth 27 extending radially from the outer periphery of the band 26, and prongs 21 extending axially of the capacitor 10 at about a perpendicular from the band 26.

A shown by the broken-away section of the casing 11 in FIG. 2, the ring 20 is dimensioned so that the teeth 27 extend radially under the curl 23. As illustrated by the sectional view of FIG. 3, the teeth 27 of ring 20, when in place, are superimposed by the curl 23 all the way around the capacitor 10.

Thus it will be seen that after the capacitor 10 is sealed by locking the closure member 14 in the open end of the casing 11 by rolling the rim 22 beyond the perpendicular onto the surface 19 of the closure member 14, the mounting ring 20 is secured in the open end of the capacitor under the curl 23 of the rolled rim 22.

The ring 20 with teeth 27 is composed of a resilient material that has springiness which allows the teeth 27 to flex and causes the teeth to recoil when flexed. Spring steel is a material having such properties. The springy teeth 27 are snapped in under the curl 23 into recess 25 and become entrapped in the recess 25. The ring 20 locks in the recess 25 of the rolled-over rim 22 of the casing 11 and is prevented from movement, even under pressure.

Referring to FIG. 4, a radially outermost edge 28 of teeth 27 is positioned within the recess 25 at or near engagement with the curl 23. The radial dimension B is between edge 28 and the point X. It is a feature of this invention that dimension B is less than dimension A.

The mounting ring 20 is assembled into the capacitor 10 by snapping the ring into the open end of casing 11. The resilient teeth 27 flex or deform under pressure sufficiently to fit in place.

According to this invention, the mounting ring 20 is assembled into the completed capacitor 10 as illustrated in FIG. 1 as a separate, independent and additional step of assembly. This allows the processing of the capacitor assembly without accomodation of the incorporation of the mounting ring, and yet accomodates the later addition of the mounting ring. Among other advantages resulting from this development is the provision of a means for mounting on circuit boards and the like of components lacking their adaptation with minimum of modification. For example, the ring 20 is inserted after sealing, aging and electrical tests have been performed.

A further advantage provided by the combination of the capacitor 10 and ring 20 is the reinforcement of the can-to-cover seal. Also when the unit is mounted on a circuit board, the mechanical vibration is transmitted from the mass of the capacitor body 12 to the casing 11 and the board through the ring 20 rather than the electrical terminals 17. A buffer zone is provided between the electrical terminals 17 and the prongs 21.

Although the invention has been described with reference to a capacitor and a specific example, modifications can be made in the component embodied in this invention within the spirit and scope of the invention as described and as defined in the following claims.

What is claimed is:

1. A sealed electrical component having a component body, a casing containing said body, said casing having a rim defining an open end, a closure member positioned within said open end sealing said body within said casing, electrical leads extending from said body, terminals mounted on said closure member and connected to said electrical leads, said rim being rolled over inwardly of said casing and forming a curl extending radially inward and in force-fit contact with said closure member so constructed and arranged as to provide a seal between said casing and said closure member, a recess between said curl and said closure member and in combination therewith a mounting ring formed of resilient material, teeth on said mounting ring extending radially outwardly of the center of said component into said recess and adapted to snappingly retain said mounting ring on said sealed component by engagement with said curl, said electrical component being completely sealed prior to attachment of said mounting ring thereto, and means on said mounting ring extending axially beyond said rim outward of said open end for mounting said sealed component.

2. A sealed capacitor having a capacitor body, a casing containing said capacitor body, said casing having a rim defining an open end, a closure member positioned within said open end sealing said capacitor body within said casing, electrical leads extending from said capacitor body, terminals mounted on said closure member and connected to said electrical leads, said rim being rolled over inwardly of said casing and forming a curl extending radially inward and in force-fit contact with said closure member so constructed and arranged as to provide a seal between said casing and said closure member, a recess between said curl and said closure member and in combination therewith a mounting ring formed of resilient material, teeth on said mounting ring extending radially outwardly of the center of said capacitor into said recess and adapted to snappingly retain said mounting ring on said sealed capacitor by engagement with said curl, said electrical component being completely sealed prior to attachment of said mounting ring thereto, and mounting means on said mounting ring extending axially beyond said rim outward of said open end for mounting said sealed capacitor.

3. The combination as claimed in claim 2 wherein said mounting means are prongs extending substantially perpendicular from said mounting ring.

4. In the combination as claimed in claim 2 a point of contact between said curl and said closure member and a radially inner point on said curl defining said recess, edges of said teeth positioned with said recess, so constructed and arranged that the radial dimension between said edges and said curl and said closure member point of contact is less than the radial dimension between said point of contact and said radially inner point.

5. The combination as claimed in claim 2, wherein said curl extends radially inward and superimposed over said teeth entraps said mounting ring on said sealed capacitor.

6. The combination as claimed in claim 2 wherein said teeth of said resilient mounting ring flex under pressure and recoil.

* * * * *